2,973,378
ALLOPREGNAN-3β,11α-DIOL DERIVATIVES
AND PROCESS

George Rosenkranz, Mexico City, Mexico, and Carl Djerassi, Birmingham, Mich., assignors to Syntex S.A., Mexico City, Mexico, a corporation of Mexico No Drawing. Original application Feb. 6, 1953, Ser. No. 335,585, now Patent No. 2,825,735, dated Mar. 4, 1958. Divided and this application June 17, 1957, Ser. No. 669,400

Claims priority, application Mexico Feb. 13, 1952

12 Claims. (Cl. 260—397.45)

The present invention relates to novel cyclopentanophenanthrene compounds and to a novel process for the production thereof.

This application is a division of application Serial Number 335,585 filed February 6, 1953, now Patent 2,825,735.

More particularly the present invention relates to novel compounds of the allopregnane series having hydroxy groups in the 11α and 21 positions, a keto group in the 3-position and esters of these compounds as well as a novel method for the production of these aforementioned compounds. The present invention also relates to certain novel intermediates for the production of the compounds just referred to such as allopregnene compounds provided with a 20 acetoxy group and a 20–21 double bond or a 21 bromo substituent. The novel compounds of the present invention are valuable intermediates for the production of 11 oxygenated cortical hormones as will be hereinafter set forth.

In our United States patent application Serial Number 307,722, filed September 3, 1952, now Patent No. 2,773,079 there have been described a method for the preparation of 20-enol acetates of allopregnan-3β,11α-diol-20-one compounds having a double bond between carbon atoms C–17 and C–20 by treating the corresponding allopregnan-3β,11α-diol-20-one with acetic anhydride in the presence of a strong acid such as p-toluene sulfonic acid.

In accordance with the present invention the surprising discovery has been made that when the same compounds i.e. allopregnane-3β,11α-diol-20-one and/or esters thereof are treated with isopropenyl acetate in the presence of a strong acid as a catalyst different novel enol acetates having a double bond between carbon atoms C–20 and C–21 are formed. It has further been discovered that this novel enol acetate may be transformed into the isomer described in the aforementioned application by refluxing the same with acetic anhydride and p-toluenesulfonic acid. Further, the new enol acetate of the present application may be easily brominated to produce the corresponding 21-bromo compounds which on treatment for a short period with sodium iodide in a lower ketone, such as acetone solution, followed by treatment with potassium acetate yields the corresponding 21-acetate, as for example, the triacetate of allopregnan-3β,11α,21-triol-20-one.

The novel 21-acetate just referred to may be saponified in accordance with the present invention and the saponification may be followed by a mild acetylation to form the 21-monoacetate of allopregnan-3β,11α,21-triol-20-one. In the alternative hydrolysis in acid medium produces the 11-mono-acetate of allopregnan-3β,11α-diol-20-one-brominated in the 21 position which on treatment with sodium iodide in a lower ketone such as acetone followed by treatment with potassium acetate gave the corresponding 11α,21-diacetate of allopregnan-3β,11α,21-triol-20-one or the equivalent 11α-acylate where the 11α-hydroxy group has been acylated with another acid residue.

Still another method has been provided in accordance with the present invention for the transformation of esters of allopregnan-3β,11α-21-triol-20-one into the 11α,21-diacylate just referred to, and this diacylate has been converted in accordance with the present invention into allopregnan-11α,21-diol-3,20-dione and/or its esters.

The following equation serves to illustrate in part the process of the present invention:

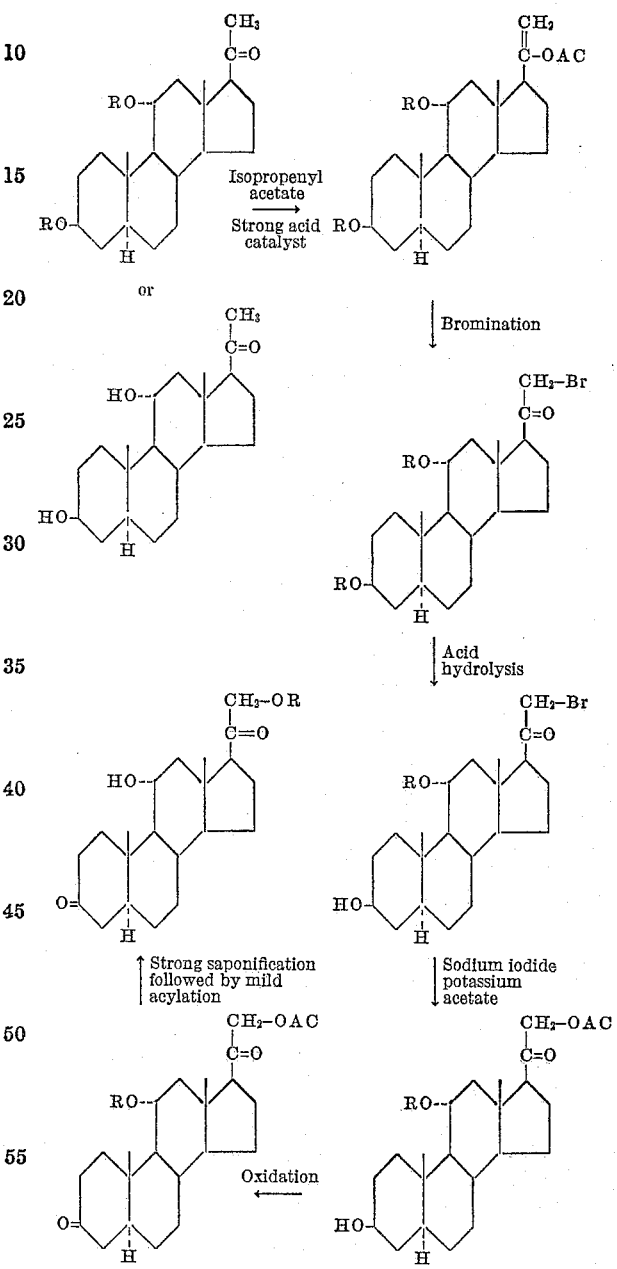

In the above equation, R is an acyl group, preferably the residue of a lower fatty acid such as acetic acid or propionic acid or an aromatic acid, preferably benzoic acid. Ac in the above equation represents the acetyl radical.

In practicing the process above outlined, a diester of allopregnan-3β,11α-diol-20-one such as the diacetate or the dibenzoate thereof, or the free diol is refluxed with a small amount of isopropenyl acetate for a short period of time, as for example three and one-half hours, in the presence of a catalytic amount of a strong acid such as concentrated sulfuric acid or p-toluenesulfonic acid. At the end of this time, a further quantity of isopropenyl acetate and a limited amount of strong acid is added and the solution is concentrated to one-third of its original volume. The concentrated reaction solution is then poured into ice and the precipitate formed extracted with a suitable solvent such as ether, purified, dried and evaporated under a vacuum until all traces of the isopropenyl acetate were eliminated. Upon purification, as hereinafter set forth in the specific examples, the crystalline product is formed, as for example $\Delta^{20}$-allopregnene-$3\beta,11\alpha,20$-triol-triacetate.

The $\Delta^{20}$-allopregnene-$3\beta,11\alpha,20$-triol-triacetate could be converted into the corresponding $\Delta^{17(20)}$-allopregnene-$3\beta,11\alpha,20$-triol triacetate described in the previously mentioned patent application by adding thereto p-toluenesulfonic acid in acetic anhydride and slowly concentrating the reaction solution for a period of four hours to a small volume, as hereinafter described in detail.

The $\Delta^{20}$-enol acetate formed in accordance with the first referred to step could be readily brominated by treating a solution of the enol acetate in a suitable solvent such as carbon tetrachloride with a mol equivalent of bromine in carbon tetrachloride. As soon as the reaction solution decolorized, it was immediately evaporated under reduced pressure and the residue was then dissolved in methanol and a small amount of concentrated hydrochloric acid added thereto. After standing at room temperature for approximately one day the mixture was then poured into dilute sodium bicarbonate solution, the precipitate extracted with ether, purified and evaporated to dryness. The residue, upon crystallization from methanol gave the 21-bromo-11-monoacetate, as for example, 21-bromo-allopregnan-$3\beta,11\alpha$-diol-20-one-11-monoacetate. Treatment of the monoacetate with sodium iodide in the presence of a lower alkyl ketone, such as acetone, followed by filtration of the sodium bromide formed, and refluxing for approximately one day with potassium bicarbonate and acetic acid, produced the corresponding 11,21 diacetate, as for example, allopregnan-$3\beta,11\alpha,21$-triol-20-one-11,21 diacetate.

The allopregnan-$3\beta,11\alpha,21$-triol-20-one 11,21-diacetate as well as other diesters of the same compound such as, for example, the dibenzoate, may also be prepared by an alternative method to be hereinafter described in detail. In any event, these diesters may be transformed into the corresponding 3-keto compounds, by oxidizing the same with an oxidizing agent such as chromic acid in acetic acid. This oxidation produced, for example, allopregnan-$11\alpha,21$-diol-3,20-dione diacetate. In place of chromic acid, other oxidizing agents such as N-bromoacetamide or aluminum t-butylate or isopropylate in the presence of a hydrogen acceptor, could be utilized. Finally, the diacylate of allopregnan-$11\alpha,21$-diol-3,20-dione could be saponified as for example with methanolic potassium hydroxide to form the corresponding allopregnan-$11\alpha,21$-diol-3,20-dione. A mild acetylation of this free compound or other acylation with slightly over 1 mol equivalent of a suitable anhydride such as acetic anhydride in pyridine would then produce the 21-monoacylate of allopregnan-$11\alpha,21$-diol-3,20-dione.

The present invention also contemplates the production of certain novel triesters as well as 21-monoesters of allopregnan-$3\beta,11\alpha,21$-triol-20-one, as for example the triacetate thereof. This reaction is illustrated by the following equation:

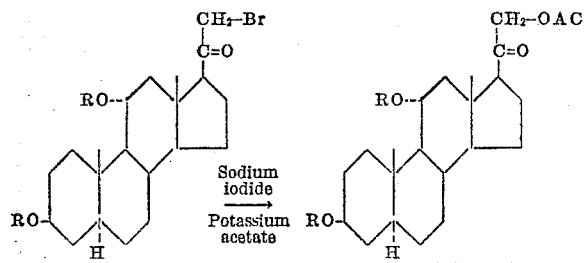

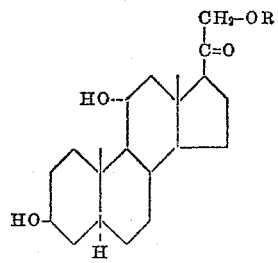

In the above equation R represents the same acyl groups as previously set forth. Ac represents acetate.

In practicing the process just above outlined, the 21-bromo-allopregnan-$3\beta,11\alpha$-diol-20-one diacylate, such as the diacetate prepared as previously set forth is dissolved in a suitable lower ketone solvent such as acetone and refluxed for a short time with sodium iodide. The sodium bromide thus formed is then filtered and the solution then refluxed for somewhat less than twelve hours with potassium bicarbonate and acetic acid. The resultant product is the triester set forth in the above equation such as for example the triacetate. Alkaline saponification of this triacetate as with methanolic potassium hydroxide produced the corresponding free compound allopregnan-$3\beta,11\alpha,21$-triol-20-one and this compound could be conventionally acylated with a suitable acid anhydride in the presence of pyridine to give the corresponding 21-monoacylate such as the 21-monoacetate.

Another process for the production of 11,21-diester of allopregnane-$3\beta,11\alpha,21$-triol-20-one from a corresponding diester of allopregnane-$3\beta,11\alpha$-diol-20-one, such as the diacetate or the dibenzoate, is illustrated in the following equation:

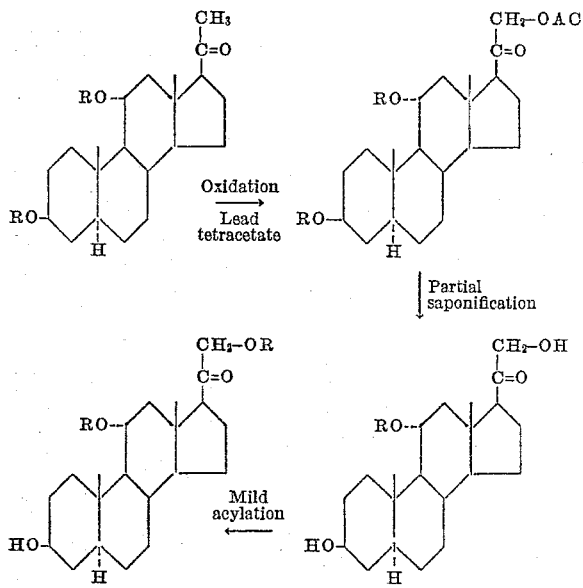

In the above equation R represents the same acyl groups as hereinbefore stated. Ac represents acetate.

In practicing the process as above outlined, a suitable diester of allopregnane-$3\beta,11\alpha$-diol-20-one, such as the diacetate or the dibenzoate is dissolved in glacial acetic acid and heated to the boiling point, thereafter lead tetracetate in acetic acid is added slowly to the boiling solution. As soon as the addition is complete, as for example about one and one-half hours, the solution is immediately cooled and diluted with water. Extraction of the product with a suitable solvent such as ether, purification of the solution, drying thereof and evaporation to dryness followed by recrystallization from a suitable solvent such as hexane acetone, produced allopregnan-3β,11α-21-triol-20-one-triacetate in the case of the diacetate starting material and the corresponding 3,11-dibenzoate 21-acetate of allopregnane-3β,11α,21-triol-20-one in the case of the dibenzoate starting material. A further portion of the product was obtained by refluxing the mother liquor with alcohol, semicarbazide hydrochloride and sodium acetate to form the semicarbazone of the starting material which was filtered from the solution. The solution was then evaporated to dryness and the product recrystallized from acetone hexane to give an additional amount of the triester.

The triester thus produced could be partially saponified by refluxing an alcoholic solution thereof for a short time with an alkali metal carbonate, such as sodium or potassium bicarbonate. Concentration of the reaction solution under vacuum, purification and recrystallization produced the 11-monoester of allopregnan-3β,11α,21-triol-20-one, such as the 11-monoacetate or the 11-monobenzoate.

The monoester prepared in accordance with the preceding step could be converted to the corresponding 11,21-diester by a mild acylation with a suitable acid anhydride such as a lower fatty acid anhydride or benzoic acid anhydride in the presence of pyridine. For this purpose, the monoester is dissolved in the pyridine and treated with slightly more than a molar equivalent of a suitable anhydride, such as acetic anhydride, at a low temperature for approximately 24 hours. Purification of the product produced allopregnan-3β,11α,21-triol-20-one-11,21-diacetate.

As will be apparent from the foregoing description there is prepared in accordance with the above process the novel and valuable final products, namely the 21-monoesters of allopregnan-11α,21-diol-3,20-dione, such as the 21-acetate. These are novel and valuable intermediates for the production of the corresponding novel 11α-isomer of the cortical hormone corticosterone since it differs from this 11α-isomer only in its ring A saturated structure. This structure may be readily provided by dibromination at positions C–2 and C–4 of ring A, followed by treatment with sodium iodide to form the 2-iodo-3-keto-Δ⁴ structure in ring A and finally by removal of the iodine by a dehalogenating agent such as zinc dust in acetic acid as described in greater detail in our United States application Serial No. 218,095, filed March 28, 1951. Further, the 21 ester of the 11α-isomer of corticosterone may be readily oxidized by a mild oxidizing agent such as chromic anhydride under mild conditions to the known adrenal cortical hormone compound 11-dehydrocorticosterone (Fieser and Fieser, Natural Products Related to Phenanthrene, third edition, pages 444 and 445).

There is also described as a final product and valuable intermediate the 21-monoesters of allopregnan-3β,11α,21-triol-20-one. This compound may also be readily oxidized to a 21-mono ester of allopregnan-21-ol-3,11,20-trione by using chromic anhydride. This last compound may be selectively reduced at the 3 position with sodium borohydride to give the 21 mono ester of the known compound Reichstein's Compound N, which may be conventionally saponified to Compound N. In the alternative the trione may be also converted to 11 dehydrocorticosterone by providing the compound with the 3-keto-Δ⁴ ring A structure by the previously outlined method.

The following specific examples serve to illustrate but are not intended to limit the present invention:

*Example I*

A solution of 1 g. of allopregnan-3β,11α-diol-20-one diacetate, or an equivalent amount of the free diol in 7 cc. of isopropenyl acetate was refluxed during 3.5 hours in the presence of one drop of concentrated sulphuric acid. After this time 3 cc. more of isopropenyl acetate and one drop of sulphuric acid were added. The solution was concentrated to one third of its original volume, poured in ice, and the precipitate was extracted with ether, washed with sodium bicarbonate and water, dried over sodium sulphate and evaporated under vacuum until all traces of isopropenyl acetate were eliminated. The light brown oil which remained as a residue was dissolved in hexane and the solution was passed through a column of 30 g. of alumina previously washed with ethyl acetate. The column was then washed with an additional amount of hexane and the eluted solution was concentrated to give colorless crystals of the $\Delta^{20}$-allopregnen-3β,11α,20-triol triacetate.

*Example II*

A solution of 1 g. of allopregnan-3β,11α-diol-20-one diacetate was treated in exactly the same way as described in Example I except that 400 mg. of p-toluenesulphonic acid were used instead of the drop of sulphuric acid. The same compound was obtained as in the previous example.

*Example III*

A solution of 500 mg. of $\Delta^{20}$-allopregnen-3β,11α,20-triol triacetate and 500 mg. of p-toluenesulphonic acid in 50 cc. of acetic anhydride was slowly concentrated in the course of 4 hours to a volume of 15 cc. The mixture was poured in ice water and then treated in the same way as described in Example I yielding the enol acetate with the double bond at 17 ($\Delta^{17(20)}$-allopregnen-3β,11α,20-triol triacetate, described in our previously mentioned patent application) the structure of which was proved by conversion into allopregnan-3β,11α,17α-triol-20-one by treatment with perbenzoic acid and alkali according to the description given in the above-mentioned patent application.

*Example IV*

A solution of bromine (the equivalent of 1 mol) in carbon tetrachloride was added dropwise to a solution of 2.5 g. of the enol acetate of Example I in 100 cc. of carbon tetrachloride. The solution decolorized rapidly and it was immediately evaporated under reduced pressure. The residue was dissolved in 80 cc. of acetone and refluxed for 15 minutes with 1.5 g. of sodium iodide. The sodium bromide formed was filtered and the solution was refluxed during 6–12 hours with 12.5 g. of potassium bicarbonate and 7.5 cc. of acetic acid. Water was added and the product was extracted with ether, washed with sodium bicarbonate and water, dried over sodium sulphate and evaporated to dryness. Crystallization from hexaneacetone yielded allopregnan-3β,11α,21-triol-20-one triacetate.

*Example V*

A solution of 1.4 g. of 21-bromo-allopregnan-3β,11α-diol-20-one diacetate (such as obtained upon evaporation of the carbon tetrachloride solution, according to Example IV) in 150 cc. of methanol and 1.4 cc. of concentrated hydrochloric acid was left standing at room temperature during 20 hours. The mixture was poured into dilute sodium bicarbonate solution and the precipitate was extracted with ether, washed, dried and evaporated to dryness. The residue crystallized from methanol to give 21-bromo-allopregnan-3β,11α-diol-20-one 11-monoacetate.

*Example VI*

1 g. of 21-bromo-allopregnan-3β,11α-diol-20-one 11-monoacetate in 60 cc. of acetone was treated with 0.6 g. of sodium iodide and then with 4 g. of potassium bicarbonate and 2.4 cc. of acetic acid, following the method described in Example IV. In this manner allopregnan-3β,11α,21-triol-20-one 11,21-diacetate was obtained.

*Example VII*

Saponification of allopregnan-3β,11α,21-triol-20-one triacetate with methanolic potassium hydroxide under an atmosphere of nitrogen at room temperature during 24 hours, followed by precipitation with water yielded allopregnan-3β,11α,21-triol-20-one which was extracted with chloroform and crystallized in the usual way. This compound was acetylized with 1.2 mols of acetic anhydride and pyridine, keeping the solution overnight at a temperature between 0° and 5° C., to give the 21-monoacetate of allopregnan-3β,11α,21-triol-20-one.

Example VIII

A solution of 1 g. of lead tetracetate in 15 cc. of acetic acid was added dropwise in the course of 90 minutes to a boiling solution of 1 g. of allopregnan-3β,11α-diol-20-one diacetate in 20 cc. of glacial acetic acid. After the addition was complete, the solution was immediately cooled and diluted with water. The product was extracted with ether, washed with sodium carbonate and water, dried over sodium sulphate and evaporated to dryness. Crystallization from hexane-acetone afforded some allopregnan-3β,11α,21-triol-20-one triacetate. The mother liquors were refluxed during 45 minutes with 35 cc. of alcohol, 0.11 g. of semicarbazide hydrochloride and 0.15 g. of sodium acetate. The solution was cooled and the precipitate of the semicarbazone of the starting material was filtered. The solution was evaporated to dryness and recrystallized from acetone-hexane to give an additional amount of allopregnan-3β,11α,21-triol-20-one triacetate.

The same reaction utilizing as the starting material the dibenzoate instead of the diacetate of allopregnan-3β,11α-diol-20-one, gave the 3,11-dibenzoate 21-acetate of allopregnane-3β,11α,21-triol-20-one having a melting point of 206°–208° C.; [α]$_D$ +44° (chloroform).

Example IX

An alcoholic solution of allopregnan-3β,11α,21-triol-20-one triacetate was refluxed during 30 minutes with 2.3 molar equivalents of sodium or potassium bicarbonate. The solution was concentrated under vacuum, poured into water and extracted with chloroform. The chloroform extract was washed, dried over sodium sulphate and evaporated to dryness. Recrystallization from ether-hexane yielded allopregnan-3β,11α,21-triol-20-one 11-monoacetate having a melting point of 230°–236° C.; [α]$_D$ +27°.

Example X

The monoacetate obtained according to Example IX was dissolved in pyridine and treated with 1.3 molar equivalents of acetic anhydride during 24 hours at a temperature between 0° and 5° C. The mixture was poured into water and left standing until the hydrolysis of the excess acetic anhydride was complete. The product was extracted with ether, washed with sodium carbonate and water, dried over sodium sulphate and evaporated to dryness. The residue was crystallized from methanol to yield allopregnan-3β,11α,21-triol-20-one 11,21-diacetate.

Example XI

A solution of 230 mg. of chromic acid in 0.5 cc. of water and 5 cc. of acetic acid was added dropwise to a solution of 1 g. of allopregnan-3β,11α,21-triol-20-one 11,21-diacetate in 30 cc. of glacial acetic acid maintaining the temperature of the mixture at 15° C. After two hours standing at room temperature the solution was poured into water and the precipitate thus obtained was filtered. Recrystallization from ethyl acetate afforded allopregnan-11α,21-diol-3,20-dione diacetate.

Example XII 1.25 g. of allopregnan-3β,11α,21-triol-20-one 11,21-diacetate was dissolved in a mixture of 150 cc. of anhydrous toluene and 15 cc. of cyclohexanone and 40 cc. of the solvent were distilled in order to remove traces of moisture. A solution of 1.5 g. of aluminum isopropylate in 50 cc. of anhydrous toluene was added to the boiling solution in the course of 45 minutes. A slow distillation was maintained during all this time. The mixture was cooled and after adding 15 cc. of a concentrated solution of sodium potassium tartrate, it was subjected to steam distillation until removal of all the volatile components. The residue was extracted with ether, washed with water, dried over sodium sulphate and evaporated to dryness. Recrystallization from ethyl acetate afforded allopregnan-11α,21-diol-3,20-dione diacetate, identical to the one obtained according to Example IV.

Example XIII

The diacetate of allopregnan-11α,21-diol-3,20-dione was saponified with methanolic potassium hydroxide at room temperature during 20 hours and maintaining the solution under an atmosphere of nitrogen. It was then diluted with water, extracted with chloroform, washed, dried and evaporated to dryness. Allopregnan-11α,21-diol-3,20-dione was thus obtained.

Acetylation with 1.2 molar equivalents of acetic anhydride in pyridine solution during 24 hours at a temperature of 5°–10° C., followed by the treatment described in Example III yielded the 21-monoacetate of allopregnan-11α,21-diol-3,20-dione.

Although the present process and the products resulting therefrom have been illustrated by members of the allopregnane series, as well as compounds having the 3β-hydroxy configuration, these same methods are applicable to compounds of the C–5 normal series, as well as compounds provided with a 3α-hydroxy group.

We claim:

1. A process for the production of an 11α-acylate 21-acetate of allopregnan-3β,11α,21-triol-20-one which comprises treating a 3β,11α diester of allopregnan-3β,11α-diol-20-one with isopropenyl acetate in the presence of a strong acid catalyst to form 3β,11α-acyloxy-20-acetoxy-Δ$^{20}$-allopregnene compound, brominating said last mentioned allopregnene compound to form the corresponding 21 bromo-allopregnan-3β,11α-diol-20-one diester, subjecting said diester to acid hydrolysis to form the corresponding 11α-mono ester of 21-bromo-allopregnane-3β,11α-ol-20-one compound and treating said 21-bromo compound with sodium iodide and potassium acetate.

2. A method for the preparation of 3β,11α-acyloxy-20-acetoxy-Δ$^{20}$-allopregnene which comprises treating the corresponding allopregnane-3β,11α-diol-20-one diester with isopropenyl acetate in the presence of a strong acid catalyst.

3. A method for the preparation of 3β,11α,20-triacetoxy-Δ$^{20}$-allopregnene compound which comprises treating the corresponding allopregnane compound selected from the class consisting of allopregnan-3β,11α-diol-20-one and diacetates thereof with isopropenyl acetate in the presence of a strong acid catalyst.

4. A method for the preparation of 21 bromo-allopregnan-3β,11α-diol-20-one diacetate which comprises brominating in an inert solvent 3β,11α,20-triacetoxy-Δ$^{20}$-allopregnene.

5. A method for the preparation of 21-bromo-allopregnan-3β,11α-diol-20-one, 11α-monoacetate which comprises hydrolizing with an acid medium the corresponding 3β,11-diacetate.

6. A method for the preparation of the 21-acetoxy derivatives of allopregnan-3β,11α-diol-20-one which comprises treating the corresponding 21-bromo derivatives with sodium iodide and potassium acetate.

7. The method of claim 6 wherein the 21-acetoxy derivative is allopregnan-3β,11α,21-triol-20-one triacetate and the starting compound is 21 bromo-allopregnan-3β,11α-diol-20-one diacetate.

8. The method of claim 6 wherein the 21-acetoxy derivative is allopregnan-3β,11α,21-triol-20-one 11,21-diacetate and the starting compound is 21-bromo-allopregnan-3β,11α-diol-20-one 11-mono acetate.

9. A new compound selected from the group consisting of the 11 mono esters and 3,11-diesters of 21-bromo-allopregnan-3β,11α-diol-20-one.

10. A new compound consisting of Δ²⁰-allopregnen-3β,11α,20-triol triacetate.

11. A new compound consisting of 21-bromo-allopregnan-3β,11α-diol-20-one diacetate.

12. A new compound consisting of 21-bromo-allopregnan-3β,11α-diol-20-one 11 monoacetate.

References Cited in the file of this patent
UNITED STATES PATENTS

| | | |
|---|---|---|
| 2,772,299 | Fonken | Nov. 27, 1956 |
| 2,773,076 | Reichstein | Dec. 4, 1956 |